Jan. 22, 1957  B. L. NIKKEL  2,778,483
NON-WRAP FINGERS FOR AUGER DRUM OF COMBINE
Filed Dec. 19, 1952

INVENTOR.
Benjamin L. Nikkel,
BY Victor J. Evans & Co.
ATTORNEYS

United States Patent Office 2,778,483
Patented Jan. 22, 1957

2,778,483

NON-WRAP FINGERS FOR AUGER DRUM OF COMBINE

Benjamin L. Nikkel, Windom, Kans.

Application December 19, 1952, Serial No. 326,857

1 Claim. (Cl. 198—217)

This invention relates to fingers on the auger drum of a combine wherein spaced fingers projecting from the surface of the drum carry grain from the auger platform into the feeder of a combine or thrashing machine and wherein the fingers pass through spaced slots for stripping or cleaning the grain therefrom.

The purpose of this invention is to shape the feeding fingers projecting from the drum of the screw conveyor or auger of a thrashing machine to prevent the grain wrapping on the drum and also to prevent throwing the grain out of the feed.

With the conventional type of radially disposed finger the surfaces of the fingers on the auger drum strike the grain throwing some of the grain from the machine and permitting the grain to wrap on the auger drum. With this thought in mind this invention contemplates an improved finger for auger drums of combines or thrashing machines wherein the leading edge of the fingers slope away from the direction of travel whereby the fingers strike the grain with a slicing action passing through the grain with an easy movement.

The object of this invention is, therefore, to provide means for forming a grain feeding finger on the auger of a combine or thrashing machine whereby the fingers strike the grain with a slicing instead of a striking action.

Another object of the invention is to provide an improved type of finger for the auger drum of thrashing machines wherein the improved fingers may be used in place of conventional fingers without changing associated parts of the machine.

A further object of the invention is to provide improvements in the design of grain feeding fingers for augers of combines or thrashing machines in which the improved fingers are of a simple and economical construction.

With these and other objects and advantages in view the invention embodies auger drum fingers including plates adapted to be radially disposed on the surface of an auger drum with the fingers positioned to mesh with and pass through slots of the guard or plate carried by the forward end of the feeder at the front of the machine and wherein the plates are formed with radially positioned trailing edges and sloping forward edges.

Other features and advantages of the invention will appear from the following description taken in connection with the drawing, wherein.

Figure 1:
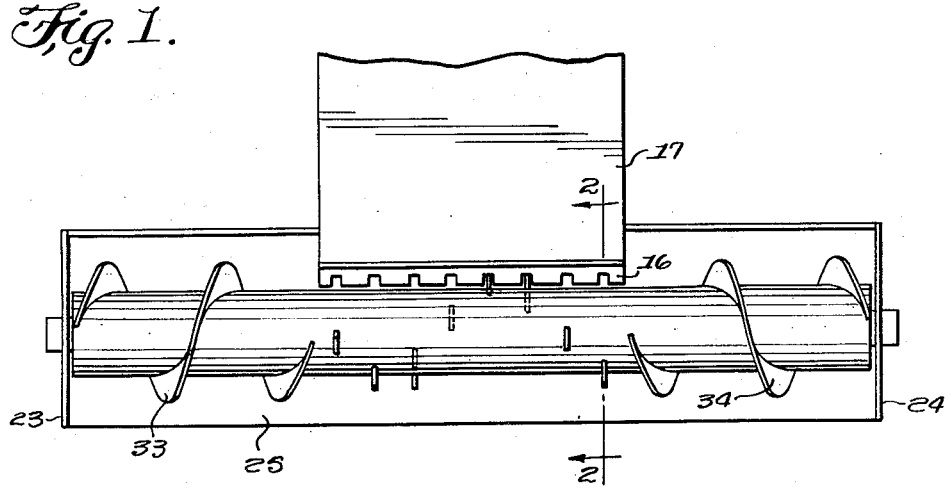
Figure 1 is a detail showing the forward end of a combine or thrashing machine with the body of the machine broken away and with the grain feeding auger suspended from the forward end of the machine.

Referring now to the drawing wherein like reference characters denote corresponding parts the improved auger drum finger of this invention includes plates or fingers 10 each having an inclined leading edge 11 and secured, preferably by welding, as shown at the points 12 and 13 to the outer surface of an auger drum 14, the plates being positioned to register with slots 15 in a plate or baffle 16 suspended from the upper wall 17 of a feeder, as indicated by the numeral 18.

Figure 2:
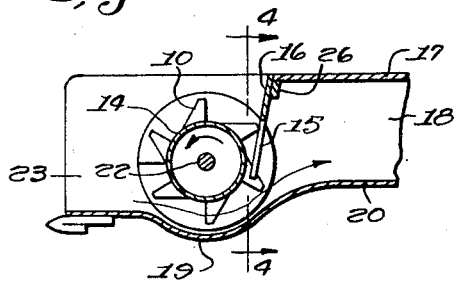
Figure 2 is a cross section through the auger and associated parts of the machine taken on line 2—2 of Fig. 1.
Figure 4:
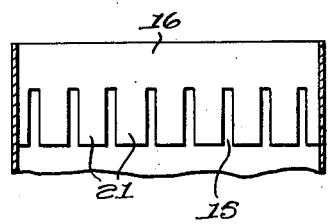
Figure 4 is a section taken on line 4—4 of Fig. 2 showing the slots in the guard plate through which the fingers of the auger drum pass.

The grain feeding fingers, formed with the plates 10 are positioned in spaced relation, to correspond with the slots 15 and also in staggered relation, as shown in Fig. 1 wherein with the auger drum rotating in a counter-clockwise direction from the position shown in Fig. 2 the fingers feed grain from a downwardly extended section 19 of a bottom wall 20 of the feeder 18 with the fingers passing through the grain and with the grain being stripped from the fingers by sections 21 of the plate 16 which are positioned between the fingers.

The drum 14 is mounted on a shaft 22 that is journaled in end walls 23 and 24 of the receiving trough 25 which is carried by the feeder 18 of the machine and the plate 16, which is angularly positioned is secured in the feeder or machine by a transversely disposed bar or flange 26.

Figures 5, 6:
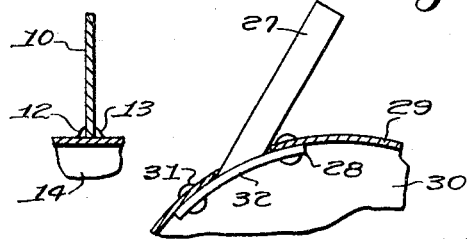
Figure 5 is a cross section taken on line 5—5 of Fig. 3 also showing one of the improved fingers mounted on the surface of the auger drum.
Figure 6 is a detail, similar to that shown in Fig. 3, showing a modification wherein a finger is formed with a sloping bar carried by a base or flange secured to the inner surface of the auger drum and positioned with the finger extended through an opening in the drum.

In the design illustrated in Fig. 6 a modification is shown wherein a finger is formed with a sloping bar 27 that extends from a base 28 and the base 28 is secured to the cylindrical wall 29 of an auger drum 30 with fasteners 31.

With the finger mounted in this manner a plurality of fingers may be provided in different positions in the auger drum with the fingers extended through openings 32 in the wall 29 of the drum.

As illustrated in Fig. 1 the auger drum is provided with oppositely disposed vanes or blades 33 and 34 which carry the grain from the ends of the trough 25 toward the center at which point the grain is fed by the fingers to the machine.

Figure 3:
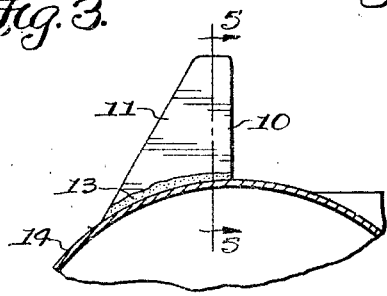
Figure 3 is a detail on an enlarged scale showing one of the improved fingers mounted on the surface of an auger drum.

With the fingers positioned as illustrated in Figs. 3 and 6 the leading edges thereof slice through the grain thereby feeding the grain with a comparatively easy movement eliminating the possibility of the grain wrapping on the drum and also substantially eliminating the possibility of the grain being thrown from the feeder by the fingers.

It will be understood that modifications, within the scope of the appended claim, may be made in the design and arrangement of the parts without departing from the spirit of the invention.

What is claimed is:

In an agricultural implement, a receiving trough including an upper wall and spaced parallel end walls, a flange depending from said upper wall and secured thereto, an inclined baffle secured to said flange, there being a plurality of spaced parallel slots in the lower edge of said baffle defining in said baffle spaced parallel stripping sections, a shaft journalled in said end walls, an auger drum mounted on said shaft, a plurality of spaced apart fingers each having curved portions complementary to and secured to the outer periphery of said drum, said fingers further including inclined leading edges, said fingers adapted to register with the slots in said baffle, oppositely disposed flights on said drum for carrying the grain from the ends of the receiving trough towards the center thereof, a bottom wall provided with a downwardly extending arcuate section arranged below said drum, said fingers being provided with rearward outer blunt corners, said fingers being arranged spirally about the central portion of the drum.

References Cited in the file of this patent

UNITED STATES PATENTS

| | | |
|---|---|---|
| 1,028,739 | Kibat | June 4, 1912 |
| 2,476,265 | Peterson | July 12, 1949 |
| 2,490,143 | Magee | Dec. 6, 1949 |
| 2,529,180 | Oehler | Nov. 7, 1950 |
| 2,612,980 | Oehler | Oct. 7, 1952 |